(12) United States Patent
Mori

(10) Patent No.: US 7,218,368 B2
(45) Date of Patent: May 15, 2007

(54) RUBBING ROLL ORIENTATION PROCESSOR FOR LIQUID CRYSTAL DISPLAY MANUFACTURING

(75) Inventor: Makoto Mori, Kanagawa (JP)

(73) Assignee: NEC LCD Technologies, Ltd., Kanagawa (JP)

( * ) Notice: Subject to any disclaimer, the term of this patent is extended or adjusted under 35 U.S.C. 154(b) by 143 days.

(21) Appl. No.: 10/990,892

(22) Filed: Nov. 17, 2004

(65) Prior Publication Data

US 2005/0105029 A1    May 19, 2005

(30) Foreign Application Priority Data

Nov. 18, 2003   (JP)   ............... 2003-387654

(51) Int. Cl.
*G02F 1/1337*    (2006.01)
(52) U.S. Cl. .......................................... 349/126; 492/29
(58) Field of Classification Search ................ 349/124, 349/126; 156/99, 295; 492/29
See application file for complete search history.

(56) References Cited

U.S. PATENT DOCUMENTS

| | | | | |
|---|---|---|---|---|
| 5,879,497 | A * | 3/1999 | Nakahara et al. | 156/99 |
| 6,064,458 | A * | 5/2000 | Mori | 349/124 |
| 6,219,123 | B1 * | 4/2001 | Naito et al. | 349/126 |
| 6,313,897 | B1 * | 11/2001 | Murayama et al. | 349/126 |
| 6,862,061 | B2 * | 3/2005 | Horiuchi | 349/126 |
| 2005/0052599 | A1 * | 3/2005 | Mizoguchi | 349/126 |

FOREIGN PATENT DOCUMENTS

| | | |
|---|---|---|
| JP | 2-17720 | 2/1990 |
| JP | 3-156423 | 7/1991 |
| JP | 8-146426 | 6/1996 |
| JP | 10-186364 | 7/1998 |
| JP | 10-319402 | 12/1998 |
| JP | 2000-171803 | 6/2000 |
| JP | 2002-014357 | 1/2002 |

OTHER PUBLICATIONS

Japanese Office Action dated Jul. 7, 2006, from corresponding Japanese Application 2003-387654.

* cited by examiner

*Primary Examiner*—Andrew Schechter
*Assistant Examiner*—Nathanael Briggs
(74) *Attorney, Agent, or Firm*—Katten Muchin Rosenman LLP

(57) ABSTRACT

An orientation processor (i.e., rubbing roller) for manufacturing a high quality liquid crystal display apparatus by subjecting orientation films formed on glass substrates of a relatively large-size liquid crystal display apparatus to a uniform orientation process. An orientation processor (i.e., rubbing roller) 10 is formed by applying a plurality of rubbing cloth pieces 12A and 12B applied with double-side bond tape to the outer periphery of the rotational roller 11. Another orientation processor (i.e., rubbing roller) 20 is formed by at least one parallel quadrilateral rubbing cloth piece 22B and 22C and substantially triangular rubbing cloth pieces 22A and 22D disposed on the opposite sides of the cloth pieces 22B and 22C. The orientation processor 10 or 20 is used to execute an orientation process of rubbing orientation films formed on the surface of glass substrates (panels) and a liquid crystal display apparatus.

13 Claims, 4 Drawing Sheets

(A)

(B)

(C)

(A)

(B)

DEVELOPED RUBBING CLOTH (C)

Prior Art

RUBBING ROLL ORIENTATION PROCESSOR FOR LIQUID CRYSTAL DISPLAY MANUFACTURING

BACKGROUND OF THE INVENTION

This application claims benefit of Japanese Patent Application No. 2003-387654 filed on Nov. 18, 2003, the contents of which are incorporated by the reference.

The present invention relates to liquid crystal display apparatus and, more particularly, to a rubbing roll apparatus for executing an orientation process on a glass substrate surface of the apparatus and a method for manufacturing a liquid crystal display apparatus using the same.

Liquid crystal display apparatus (or liquid crystal display panel) is relatively thin and consumes low power, and is thus broadly spread as display units of personal computers and those of car navigation apparatuses.

A liquid crystal display is usually formed by disposing face-to-face and at a very small distance two thin glass panels having electrodes of TFTs (Thin Film Transistors) formed thereon and filling liquid crystal in the space between these glass panels. These glass panels have respective orientation films formed on their inner surfaces, and these orientation films are subjected to a predetermined orientation process, thereby obtaining orientation of the sealed liquid crystal. The orientation process is usually carried out by using an orientation processing apparatus, i.e., a rubbing roll or rubbing apparatus.

Heretofore, various types of orientation processing apparatus have been proposed. As a typical prior art orientation processing apparatus, a rubbing apparatus has been disclosed, which is formed by applying a rubbing cloth with a double-side bond tape or the like to the surface of a cylindrical rotational roller (see Literature 1: Japanese Patent Laid-open No. 2000-171803, for example).

FIGS. 3(A) and 3(B) show an example of such a prior art orientation processing apparatus. FIG. 3(A) is a perspective view, and FIG. 3(B) is a developed view of a rubbing cloth. As shown in FIG. 3(A), this prior art orientation processing apparatus 30 comprises a cylindrical rotational roller 31 and a plurality of rubbing cloth pieces 32 provided on the outer periphery (i.e., peripheral surface) of the rotational roller 31 and extending substantially parallel to the axis of the rotational roller 31. These rubbing cloth pieces 32 are applied by using a double-side bond tape or the like such that their adjacent edges abut, i.e., form contact seams 34. This orientation film processing apparatus 30 is used for the orientation process such that it is rotated on and rubs an orientation film, which is printedly formed on, for instance, a glass panel of a liquid crystal display apparatus. In this case, as shown in the developed view in FIG. 3(B), a circumferential pattern of a plurality of seams 34 is formed FIGS. 4(A) and 4(B) show a different orientation processing apparatus disclosed in the Literature 1. FIG. 4(A) is a perspective view, and FIG. 4(B) is a developed view. This orientation film processing apparatus 40 comprises a cylindrical rotational roller 41 and a relatively thin rubbing cloth piece 42 helically wound on the outer periphery of the rotational roller 41 such that the edges of adjacent turns are in contact with each other. Also this rubbing cloth 42 is applied to the outer periphery of the rotational roller 41 at an acute angle to the direction perpendicular to the axis of rotation by using a double-side bond tape or the like. Thus, as shown in the developed view 43 of FIG. 4(B), a pattern of a plurality of inclined seams 44 is formed.

Display panels such as liquid crystal display apparatuses are increasing in size more and more, and their price competition becomes harder and harder due to mass production. In such large-size liquid crystal display apparatuses, the panel size is naturally increasing in size. However, the use of the above orientation processing apparatus or rotational roller necessitates a wide cloth piece, which is applied as rubbing cloth substantially parallel to or at an edge to the axial direction. The manufacture of wide cloth has a problem that it is difficult to obtain uniform stretch by applying a predetermined stretching force in the axial direction, thus leading to lack of pile length uniformity and increase of possibility of occurrence of abnormal orientation. In the case of helically winding a narrow rubbing cloth piece on the outer periphery of the rotational roller, the direction of pile for raising is determined by the rubbing cloth application angle, thus forming a seam at a predetermined angle from the circumferential direction. This causes the portion which has not been uniformly rubbing-processed.

SUMMARY OF THE INVENTION

The present invention was made in view of the above problem inherent in the prior art, and it has an object of providing rubbing roll apparatus, liquid crystal display and manufacturing method thereof capable of uniform orientation process.

According to an aspect of the present invention, there is provided an orientation processor for executing an orientation process of causing orientation of liquid crystal by rubbing an orientation film formed on one surface of a glass substrate with rubbing cloth mounted on the outer periphery of a rotational roller, wherein: the rubbing cloth is constituted by a plurality of substantially rectangular rubbing cloth pieces each having a width substantially corresponding to one of a plurality if divisions of the length of the rotational roller and a length substantially equal to the circumference of the rotational roller, the plurality of rubbing cloth pieces being mounted on the outer periphery of the rotational roller such as to be substantially parallel to the axial direction of the rotational roller.

The orientation processor according to claim 1, wherein the plurality of rubbing cloth pieces secured to the rotational roller form seams, at which adjacent ends of rubbing cloth pieces are in contact with each other.

According to another aspect of the present invention, there is provided a method of manufacturing a liquid crystal display apparatus comprising the steps of: spaced-apart disposing a plurality of panels constituted by glass substrates with orientation films formed thereon, executing an orientation process executed with an orientation processor, which is formed by winding a plurality of rubbing cloth pieces on the outer periphery of a rotational roller in a juxtaposed fashion in the axial direction of the rotational roller, by rubbing the orientation films with the seams between adjacent rubbing cloth pieces positioned to be between adjacent panels, and pouring liquid crystal into a gap formed between opposed orientation films of paired panels having been subjected to the orientation process with the orientation processor.

According to other aspect of the present invention, there is provided an orientation processor for executing an orientation process of causing orientation of liquid crystal by rubbing an orientation film formed on a glass substrate with rubbing cloth mounted on the outer periphery of a rotational roller, wherein: the rubbing cloth is constituted by at least one central parallel quadrilateral rubbing cloth piece and a pair of substantially triangular rubbing cloth pieces disposed on opposite asides of the parallel quadrilateral rubbing cloth piece, the rubbing cloth pieces being mounted on the outer periphery of the rotational roller along the axial direction thereof.

The plurality of rubbing cloth pieces are mounted on the outer periphery of the rotational roller with adjacent ends of them connected to each other. The plurality of rubbing cloth pieces mounted on the outer periphery of the rotational roller are substantially rectangular in the developed view. T seams between adjacent rubbing cloth pieces are fixed at all oppositions in the axial direction of the rotational roller.

Other objects and features will be clarified from the following description with reference to attached drawings.

PREFERRED EMBODIMENTS OF THE INVENTION

Preferred embodiments of the present invention will now be described with reference to the drawings.

Figure 1:
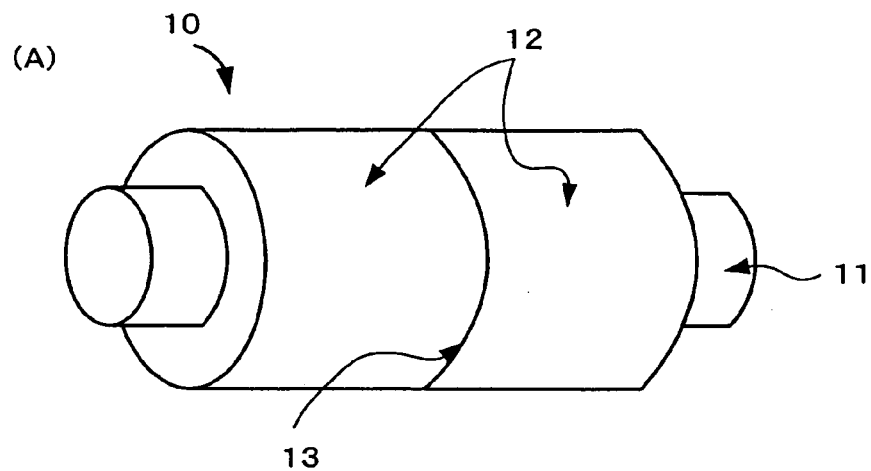
FIGS. 1(A) to 1(C) show a perspective view, a developed view of rubbing cloth pieces and a plan view showing a panel of a liquid crystal display apparatus formed by using the orientation processing apparatus shown in FIG. 1(A) according to a first embodiment of the present invention.
Figure 1:
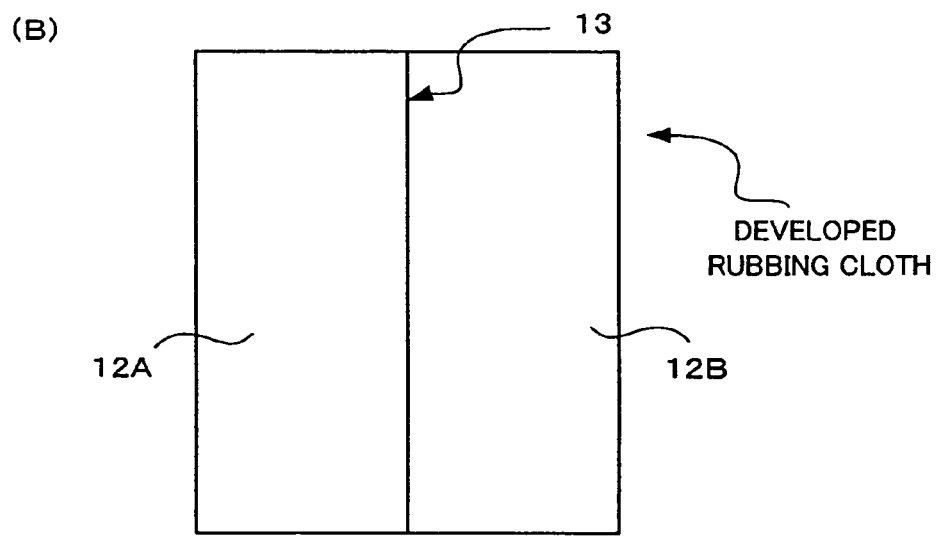
Figure 1:
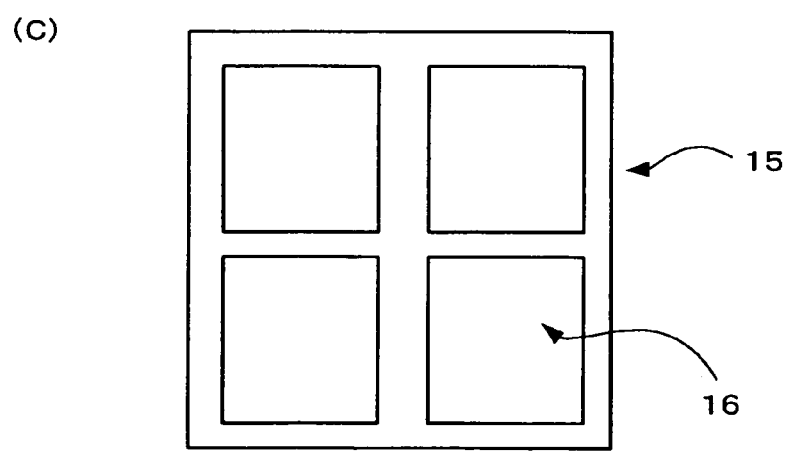

FIGS. 1(A) to 1(C) show a first embodiment of the orientation processing apparatus (hereinafter being also referred to as rubbing roller) according to the present invention. FIG. 1(A) is a perspective view, FIG. 1(B) is a developed view of rubbing cloth pieces, and FIG. 1(C) is a plan view showing a panel of a liquid crystal display apparatus formed by using the orientation processing apparatus shown in FIG. 1(A).

This rubbing roller 10 comprises a rotational roller 11 and rubbing cloths 12 applied with double-side bond tape or the like to the outer periphery of or the rotational roller 11. The most significant feature of this rubbing roller 10 is that it is constituted by a plurality of (for instance two) rubbing cloth pieces 12A and 12B, which are applied such that they are adjacent to each other in the axial direction of the rotational roller. In other words, as shown in the developed view in FIG. 1(B), the rubbing cloth pieces 12A or 12B each have a rectangular shape having a width, which corresponds to one of a plurality of (for instance two) divisions of the length of the rotational roller 11, and a length corresponding to the circumferential of the rotational roller 11. These rubbing cloth pieces 12A and 12B are preferably applied to the outer periphery of the rotational roller 11 such that adjacent ones of them abut each other, whereby a seam 13 is inevitably formed between the rubbing cloth piece 12A and 12B.

A process of manufacture of a liquid crystal display apparatus using the rubbing roller 10 according to the present invention will now be described with reference to FIGS. 1(A) to 1(C). As shown in FIG. 1(C), a panel set sheet 15 to be rubbed has, for instance, four panels 16 disposed left and right and up and down. The surface of the panel set sheet 15 having a plurality of (for instance four) panels 16 is rubbed with the rubbing roller 10 as shown in FIG. 1(A) according to the present invention in the execution of an orientation process on orientation films (not show) formed on the surface of the panels 16, respectively. It is to be noted here that the rubbing is made by aligning (i.e., positioning) the seams 13 of the rubbing cloth pieces 12 of the rubbing roller 10 to coincide with the gaps between the left and right panels 16. Thus, the orientation panels of the panels 16 are subjected to uniform orientation by the rubbing cloth pieces 12A and 12B without being adversely affected by the seams 13.

Then, as noted before in connection with FIG. 1(C), the orientation surfaces of appropriate two orientation processed panels 16 are disposed face to face with a very small gap of the order of microns provided between them. It is to be assumed that each panel (or glass substrate) 16 has its surface opposite the orientation film formation surface with TFT or like electrodes (and filters in the case of a color liquid crystal display apparatus). The gap between the two panels 16 (except for liquid crystal injection port) is sealed with an appropriate seal member. Then, liquid crystal is injected into the gap between the panels (or glass substrates) from the liquid crystal injection port. After the liquid crystal injection, the liquid crystal injection port is sealed with an appropriate seal member such as an ultraviolet-setting resin.

The liquid crystal display apparatus having the above construction is provided with an integral or separate electrode drive circuit for driving the electrodes. In this way, it is made possible to display letters and drawings by controlling the orientation state of the injected liquid crystal. Usually, ell-known back-light is provided on the back surface to obtain display of letters and drawings in good contrast by changing the light transmission according to the orientation state of the liquid crystal.

Figure 2:
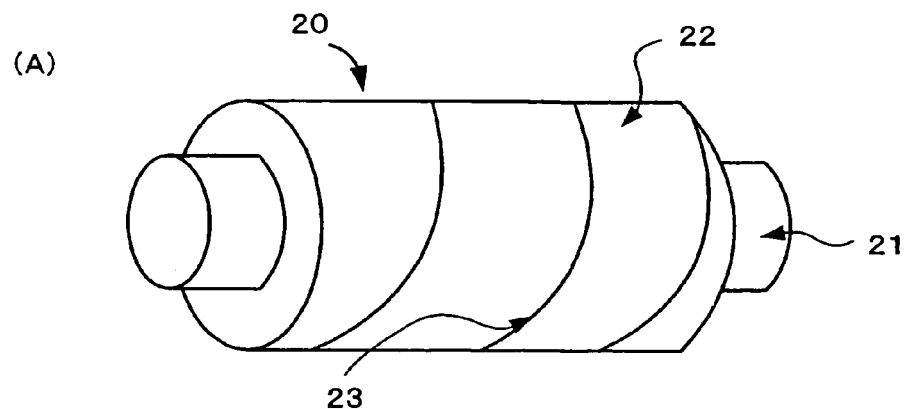
FIGS. 2(A) to 2(C) show a perspective view showing a rubbing roller 20, a developed view showing central ones of rubbing cloth pieces and a view showing one of the rubbing cloth pieces in the developed view of FIG. 2(B) according to a second embodiment of the present invention.
Figure 2:
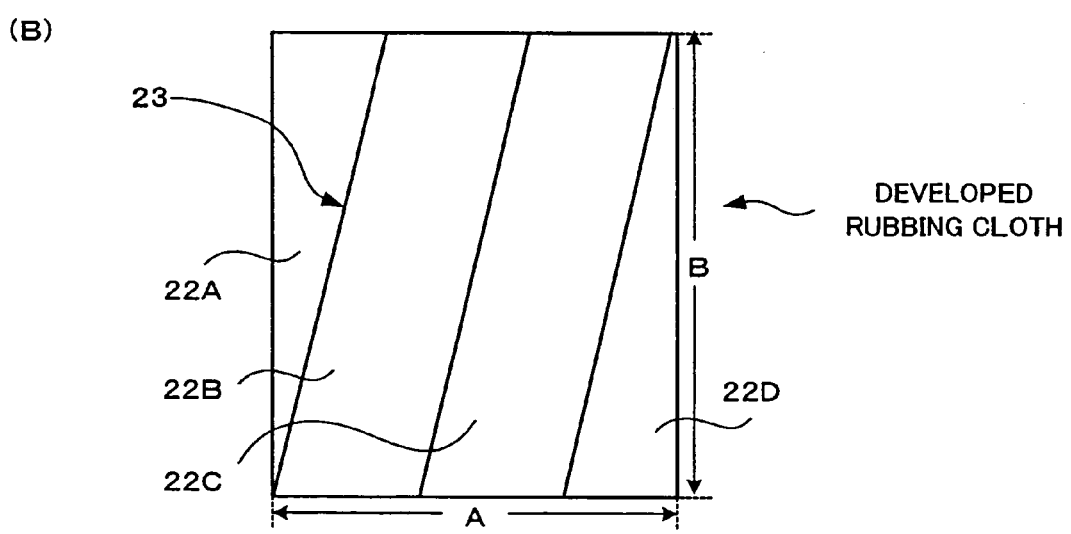
Figure 2:
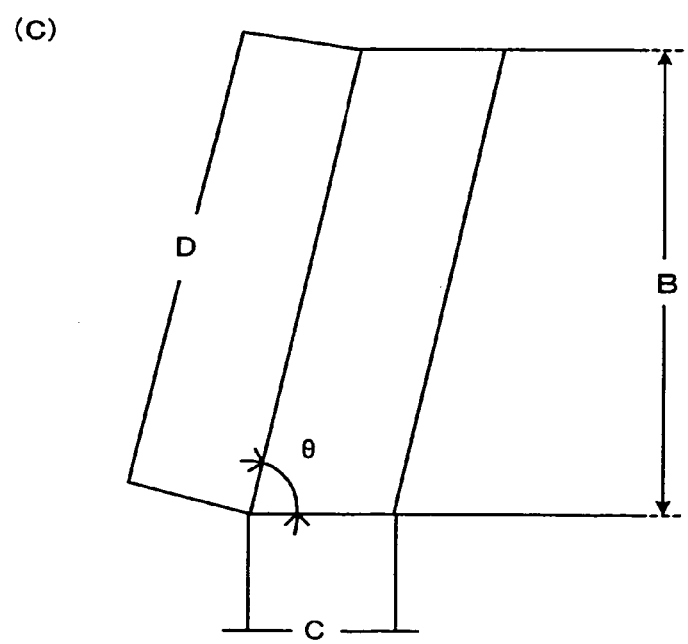
Figure 3:
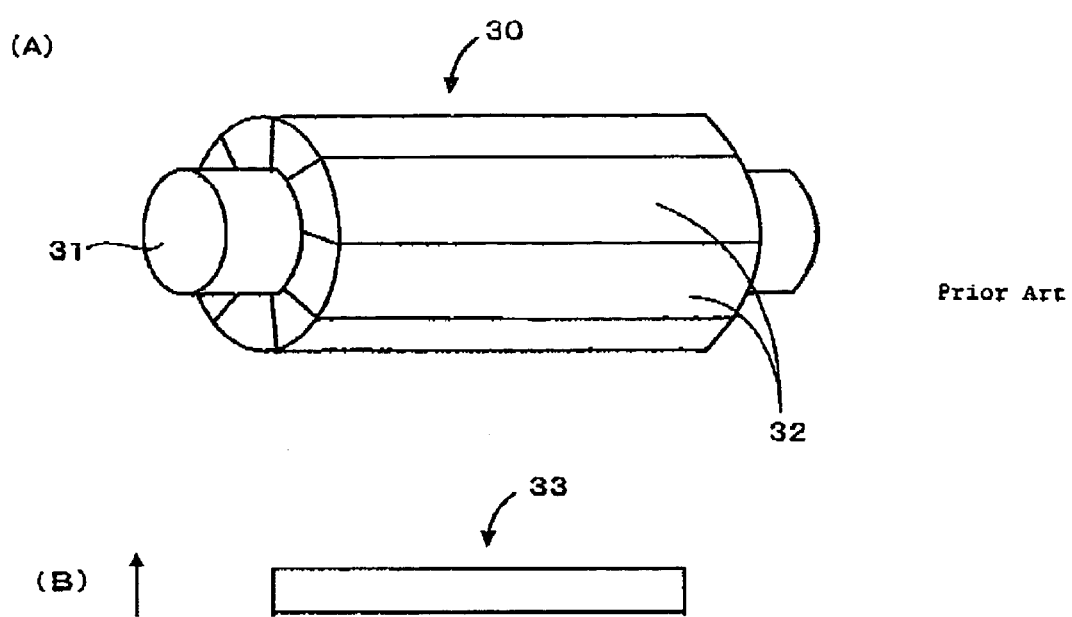
FIGS. 3(A) and 3(B) show a perspective view showing a rubbing roller and a developed view of rubbing cloth according to a first prior art.
Figure 4:
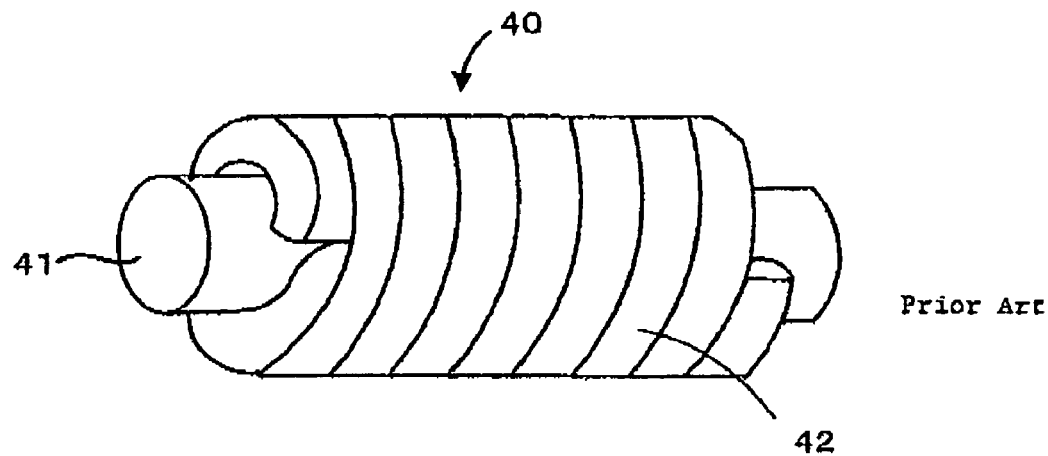
FIGS. 4(A) and 4(B) show a perspective view showing a rubbing roller and a developed view of rubbing cloth according to a second prior art.
Figure 4:
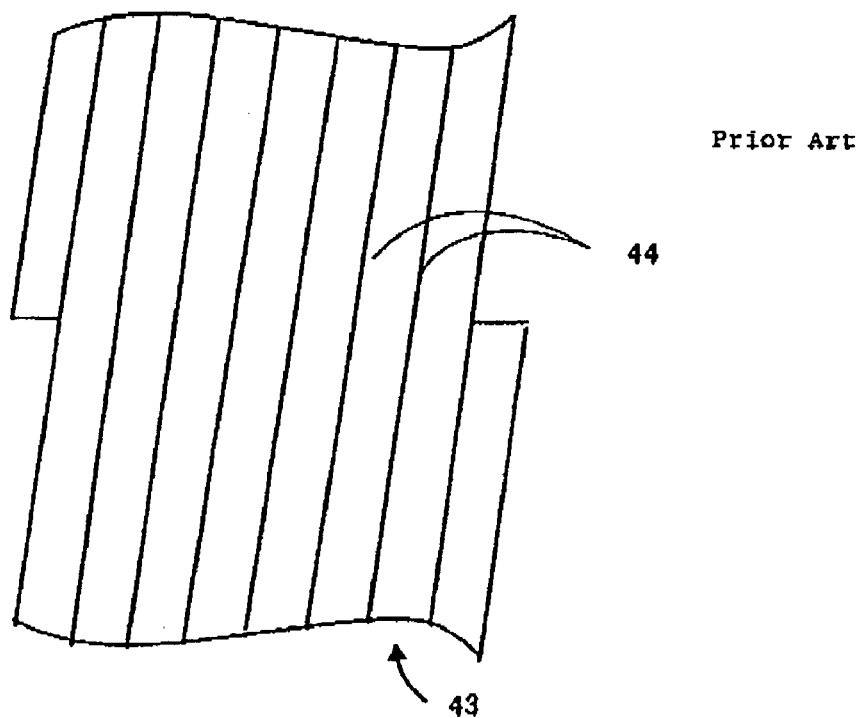

A second embodiment of the present invention will now be described with reference to FIGS. 2(A) to 2(C). FIG. 2(A) is a perspective view showing a rubbing roller 20, FIG. 2(B) is a developed view showing central ones of rubbing cloth pieces, and FIG. 2(C) is a view showing one of the rubbing cloth pieces in the developed view of FIG. 2(B).

The rubbing roller 20 shown in FIGS. 2(A) to 2(C) as the second embodiment of the present invention features that the rubbing cloth mounted on the outer periphery of the rotational roller is constituted by at least one central, substantially parallel quadrilateral rubbing cloth piece and substantially triangular rubbing cloth pieces provided at the opposite ends of the central rubbing cloth piece. With this arrangement, a constant number of (for instance three) seams between adjacent rubbing cloth pieces are formed on the entire outer periphery of the rotational roller. Also this rubbing roller 20, like the first embodiment of the rubbing roller 10, is constituted by the rotational roller 21 and the rubbing cloth 22 applied to the outer periphery of the rotational roller 21.

As shown in the developed rubbing cloth view of FIG. 2(B), in this specific example of the rubbing roller 20, the rubbing cloth 22 is cut out as narrow rubbing cloth pieces from the material cloth. Specifically, a total number of four rubbing cloth pieces 22A to 22D, i.e., central rubbing cloth pieces 22B and 22C cut out in a parallel quadrilateral shape having a certain angle and substantially triangular rubbing cloth pieces 22A and 22D at the opposite ends, as shown in FIG. 2(C), are formed. As shown in FIG. 2(C), the rubbing width of the rubbing cloth piece 22B (or 22C) is denoted by A, the outer periphery of the rotational roller 21 is denoted by B, the lower end of the cut-out cloth piece is denoted by C, the left side length of the cut-out cloth piece is denoted by D, the width of the material cloth is denoted by E, the number of seams 23 is denoted by F, and the angle between the left side and the lower end of the cutout cloth piece is denoted by θ.

First, A/(E/2)=F is calculated, and the decimally rounded-off number is the number F of seams 23. Then, the length of each parallel quadrilateral cloth piece cut out from the material cloth is obtained from the number of seams 23. The dimension C of the cut-out lower end is obtained from C=A/F. Also, the angle θ between the cut-out lower end and left side is obtained as θ=tan$^{-1}$(B/C). The left side length D of the cut-out cloth piece is obtained as D=C/sin θ. By obtaining C, D and F in this way, none of the seams 23 appears twice on the same circumference, thus satisfying an equation $$C=\sqrt{((D^2-D^*\sin\theta)^2))}.$$

A plurality of rubbing cloth pieces 22 which are cut out from the material cloth by using the above equation, are applied with a double-side bond tape, for instance, to the outer periphery of the rotational roller 21. The rubbing cloth pieces are applied such that the same number of seams 23 are located on the same circumference. The rubbing roller 20 which is formed in this way is used for the orientation process. Specifically, the TFTs used in the liquid crystal display apparatus and orientation films (not shown) formed on the color filter substrates are rubbed with the rubbing cloth pieces 22 by rotating the rotational roller 21 of the rubbing roller 20.

At this time, by arranging such that the seams 23 of the rubbing cloth pieces 22 appear uniformly in the surface, no same seam comes to the same circumference of the rotational roller 21, and it is thus possible to improve the uniformity of rubbing of the rubbing roller 20. Also, by having he seams 23 to appear uniformly, the pressure applied to the glass substrate is dispersed, and no same seam appears on the same circumference. Thus, it is possible to manufacture glass substrate (i.e., panel) free from rubbing irregularities, i.e., subjected to substantially uniform orientation process.

According to the present invention, the following pronounced practical effects are obtainable. When winding a plurality of rubbing cloth pieces on the outer periphery of the roller shaft, no seam part between any adjacent rubbing cloth piece edges touches the display part of the liquid crystal apparatus. Thus, no abnormal orientation part appears on the display surface, and it is possible to carry out uniform orientation process and obtain high quality liquid crystal display apparatus. Also, it is possible to manufacture a plurality of uniformly orientation processed panels at a time and reduce the cost of manufacture.

Changes in construction will occur to those skilled in the art and various apparently different modifications and embodiments may be made without departing from the scope of the present invention. The matter set forth in the foregoing description and accompanying drawings is offered by way of illustration only. It is therefore intended that the foregoing description be regarded as illustrative rather than limiting.

What is claimed is:

1. An orientation processor for executing an orientation process of causing orientation of liquid crystal by rubbing an orientation film formed on one surface of a glass substrate with rubbing cloth mounted on the outer periphery of a rotational roller, wherein:

the rubbing cloth is constituted by a plurality of substantially rectangular rubbing cloth pieces each having a width substantially corresponding to one of a plurality of divisions of the length of the rotational roller and a length substantially equal to the circumference of the rotational roller, the plurality of rubbing cloth pieces being mounted on the outer periphery of the rotational roller so as to be substantially parallel to the axial direction of the rotational roller.

2. The orientation processor according to claim 1, wherein the plurality of rubbing cloth pieces secured to the rotational roller form setups, at which adjacent ends of rubbing cloth pieces are in contact with each other.

3. An orientation processor for executing an orientation process of causing orientation of liquid crystal by rubbing an orientation film formed on a glass substrate with rubbing cloth mounted on the outer periphery of a rotational roller, wherein:

the rubbing cloth is constituted by at least one central parallel quadrilateral rubbing cloth piece and a pair of substantially triangular rubbing cloth pieces disposed on opposite asides of the parallel quadrilateral rubbing cloth piece, the rubbing cloth pieces being mounted on the outer periphery of the rotational roller along the axial direction thereof.

4. The orientation processor according to claim 3, wherein the plurality of rubbing cloth pieces are mounted on the outer periphery of the rotational roller with adjacent ends of them connected to each other.

5. The orientation processor according to claim 3, wherein the plurality of rubbing cloth pieces mounted on the outer periphery of the rotational roller are substantially rectangular in the developed view.

6. The orientation processor according to claim 3, wherein the seams between adjacent rubbing cloth pieces are fixed at all oppositions in the axial direction of the rotational roller.

7. The orientation processor according to claim 2, wherein:

the glass substrate includes a plurality of panels having orientation films formed thereon; and the at least one seam between adjacent rubbing cloth pieces is oriented to rub an the orientation film between adjacent panels of the glass substrate.

8. The orientation processor according to claim 7, wherein:

liquid crystal is poured into a gap formed between opposed orientation films of paired panels having been subjected to the orientation process with the orientation processor.

9. The orientation processor according to claim 3, wherein;

each circumference of the rotational roller has at most one seam.

10. The orientation processor according to claim 3, wherein:

the rubbing cloth has width A;

the outer periphery of the rotational roller has circumference B;

a lower end of one of the central parallel quadrilateral rubbing cloth pieces has length C;

a left side length of the one of the central parallel quadrilateral rubbing cloth pieces has length D;

a width of a material cloth from which the one of the central parallel quadrilateral rubbing cloth pieces is cut is denoted by E;

a number of seams in the rubbing cloth is denoted by F; and an angle between the left side and the lower end of the one of the central parallel quadrilateral rubbing cloth pieces is denoted by $\theta$.

11. The orientation processor according to claim 10, wherein:

A/(E/2) is calculated and the decimally rounded-off number is F;

A/F is C;

$\tan^{-1}$ (B/C) is $\theta$; and

C/sin $\theta$ is D.

12. The orientation processor according to claim 11, wherein:

$\sqrt{((D^2-D*\sin \theta)^2))}$ is C.

13. The orientation processor according to claim 3, wherein a number of seams between adjacent portions of the at least one central parallel quadrilateral rubbing cloth piece in any circumference of the rotation roller is at most two.

\* \* \* \* \*